United States Patent

Faith et al.

[15] 3,702,945

[45] Nov. 14, 1972

[54] MOS CIRCUIT WITH NODAL CAPACITOR PREDISCHARGING MEANS

[72] Inventors: Jack L. Faith, San Jose; Lee L. Boysel; Joseph P. Murphy, both of Saratoga, all of Calif.

[73] Assignee: Four-Phase Systems, Inc., Cupertino, Calif.

[22] Filed: Sept. 8, 1970

[21] Appl. No.: 70,375

[52] U.S. Cl.....................................307/251, 307/304
[51] Int. Cl................................................H03k 17/00
[58] Field of Search...307/205, 221 C, 251, 279, 307

[56] References Cited

UNITED STATES PATENTS

| | | | |
|---|---|---|---|
| 3,267,295 | 8/1966 | Zuk | 307/205 |
| 3,431,433 | 3/1969 | Ball et al. | 307/251 |
| 3,526,783 | 9/1970 | Booher | 307/251 |
| 3,536,936 | 10/1970 | Robinstein et al. | 307/251 |
| 3,573,498 | 4/1971 | Ahrons | 307/251 |

OTHER PUBLICATIONS

Lohman " Some Applications of Metal–Oxide Semiconductors to Switching Circuits" May 1964 SCP & Solid State Technology, pages 31– 34

*Primary Examiner*—Donald D. Forrer
*Assistant Examiner*—Ro E. Hart
*Attorney*—Lindenberg, Freilich & Wasserman

[57] ABSTRACT

A multiphase inverter type circuit with MOS elements, in which nodal capacitor precharging and conditional discharging takes place, is disclosed. The inverter type circuit, in addition to the conventional elements, includes one or more additional MOS elements which are used to predischarge all nodal capacitors prior to the precharging phase. Such predischarging insures that during conditional discharging even though charges are coupled out of gate capacitors of input MOS elements, which are turned ONdue to appropriate binary inputs, supplied thereto, through the parasitic capacitors of the latter-mentioned elements, the coupled-out charges do not affect the ON state of the elements to which the binary inputs are applied. By predischarging all nodal capacitors, during precharging charges are coupled into the gate capacitors of the input MOS elements through their parasitic capacitors. These charges are equal to the charges which are coupled out during the subsequent conditional discharging phase. Consequently, the net charges at the gate capacitors are not affected by the charges coupled in and coupled out through the parasitic capacitors, whose adverse effect is thereby cancelled.

17 Claims, 13 Drawing Figures

JACK L. FAITH
LEE L. BOYSEL
JOSEPH P. MURPHY
INVENTORS

BY Lindenberg Freilich & Wasserman

ATTORNEYS

JACK L. FAITH
LEE L. BOYSEL
JOSEPH P. MURPHY
INVENTORS

BY Lindenberg, Freilich & Wasserman

ATTORNEYS

JACK L. FAITH
LEE L. BOYSEL
JOSEPH P. MURPHY
INVENTORS

BY Lindenberg, Freilich & Wasserman

ATTORNEYS

JACK L. FAITH
LEE L. BOYSEL
JOSEPH P. MURPHY
INVENTORS

BY Lindenberg, Freilich & Wasserman

ATTORNEYS

JACK L. FAITH
LEE L. BOYSEL
JOSEPH P. MURPHY
INVENTORS

BY Lindenberg, Freilich & Wasserman

ATTORNEYS

JACK L. FAITH
LEE L. BOYSEL
JOSEPH P. MURPHY
INVENTORS

BY Lindenberg, Freilich & Wasserman

ATTORNEYS

MOS CIRCUIT WITH NODAL CAPACITOR PREDISCHARGING MEANS

BACKGROUND OF THE INVENTION

1. Field of the Invention

The present invention generally relates to integrated circuitry and, more particularly, to improvements in circuits or devices incorporating integrated metal-oxide semiconductor (MOS) circuits.

2. Description of the Prior Art

In the development of large-scale integration (LSI) technology it has been accepted that the MOS component or element offers many significant advantages over its bipolar counterpart. These advantages include reduced circuit cost, greatly increased component density, and reduced power dissipation. Recently, MOS/LSI systems ranging from simple desk calculators and controllers for small computers have appeared in commercial quantities.

Generally, in a MOS circuit multiphase clocking or dynamic switching is employed. Among the well known techniques are the two, three and four-phase clocking arrangements. As is appreciated by those familiar with the art, circuit speed and component density are greater in a typical four-phase counterpart. The operation of any multiphase circuit is based on the presence of internal nodal capacitors which are capable of temporarily storing charges. Each capacitor's voltage level represents either a logic zero (0) level or a logic one (1) level, hereafter simply referred to as 1 or 0, respectively. The clocking phases are used to activate different MOS elements to provide nodal capacitors' charging and discharging paths in order to produce an appropriate binary output as a function of one or more binary inputs and the particular logic function which the circuit is designed to produce.

Herein it is assumed that a MOS element whose gate is at a 1 level is in a ON state or ON, and is in the OFF state or OFF when the gate is at a 0 level. The gate is at a level which depends on the charge of a capacitor between the gate and a reference potential, such as ground. In a typical multiphase circuit, a capacitor precharging and conditionally discharging technique is employed. Typically, each circuit includes one or more MOS elements to which binary data input signals are supplied. These elements can therefore be thought of as the input data controlled MOS elements or simply the control MOS elements of the circuit. These control MOS elements of the circuit are connected to MOS elements which are turned on during the precharging phase to precharge most or all of the nodal capacitors and an output capacitor.

The control MOS elements are also connected to MOS elements which are turned ON during the conditional discharging phase. If the control MOS elements which are connected in series between the output capacitor and the MOS elements, which are turned ON during the discharging phase, are turned ON, a continuous discharge path is provided for the output capacitor. If, however, one or more of the control MOS elements in the series chain is in its OFF state, the output capacitor remains charged up. Thus, after the discharge phase, the charge of the output capacitor represents either a 1 or a 0 level depending on the input data and the connections of the various control MOS elements. For proper operation it is vital that the states of the control MOS elements not be affected by the discharging capacitors, during the discharging phase. Alternately stated, for proper operation, it is important that during the discharging phase, the discharging of any nodal capacitors should not affect the charges of the capacitors at the gates of the various control MOS elements.

In prior art MOS circuit designs it was found that component density and fan out capabilities are significantly limited if the above basic requirement is to be satisfied. MOS elements are characterized by parasitic capacitances between their nodes or terminals, generally referred to as the gate (G), the drain (D) and the source (S). The stray capacitances are between the gate and drain and gate and source. These are generally designated by $C_{gd}$ and $C_{gs}$, respectively.

It was discovered that unless special steps are taken, during the discharging phase as nodal capacitors, at the drain or source some of the control MOS elements, are discharged, due to the stray capacitors, some charge is coupled out of the capacitors at the gates of some of the control MOS elements. Quite often due to the coupled out charges, the gate levels of some of the control MOS elements drop below the levels needed to maintain these elements in the ON state. Consequently, these elements are switched to their OFF state, thereby interrupting the discharge path for some of the nodal capacitors and particularly for the output capacitor. As a result, the output capacitor which should be discharged to represent a 0 level or a 0, often remains partially charged. The remaining charge is often high enough to represent an erroneous 1 level. Thus, circuit malfunctioning or an error results.

To minimize such errors herebefore the circuits have been designed with large capacitors at the gates of the control MOS elements to reduce charge losses. Increased gate capacitor sizes greatly reduce element density, which is one of the primary advantages of MOS circuits. Also, fan out is greatly reduced to prevent such errors from occurring.

OBJECTS AND SUMMARY OF THE INVENTION

It is a primary object of the present invention to provide a new improved MOS circuit which eliminates the above-referred to prior art disadvantages.

Another object of the present invention is to provide a new arrangement for use in MOS circuits to provide proper operation with relatively small gate capacitors.

A further object of the present invention is to provide a novel arrangement in a MOS circuit to insure proper discharging of precharged nodal capacitors without affecting the charged levels of capacitors at gates of control MOS elements, through which the precharged nodal capacitors are discharged.

Still a further object of the present invention is to provide a novel arrangement in MOS circuits with high element densities and/or increased fan out, as compared with analogous prior art MOS circuits.

These and other objects of the invention are achieved by the addition of a MOS element which is enabled or turned ON at a time, depending on the particular phasing arrangement, so that internal nodal capacitors, which are to be first precharged and thereafter conditionally discharged through one or more control MOS elements, depending on the binary levels of the input signal at the gates of the control MOS elements, are predischarged at the same time that the gate capacitors of the control MOS elements are charged to a voltage which turns ON the control MOS elements. Thereafter, at a subsequent phase, the internal nodal capacitors are precharged. Due to the stray capacitors of the control MOS element, some charge is coupled to the gate capacitors of the control MOS elements, raising the voltages thereacross to levels which are significantly above the levels needed to maintain the control MOS elements in their ON state. Then, during a subsequent discharging phase when the internal nodal capacitors are discharged through the control MOS elements, which are ON; as the internal nodal capacitors discharge, some of the charge in the gate capacitors of the control MOS element is coupled out through the stray capacitors, lowering the voltages across the gate capacitors. However, since previously the voltages were raised above the levels needed to maintain the control MOS elements in the ON state, even though the voltage levels across the capacitors are reduced, they remain above the levels needed to maintain the control MOS elements in the ON state, during the entire phase period when the internal nodal capacitors are fully discharged.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
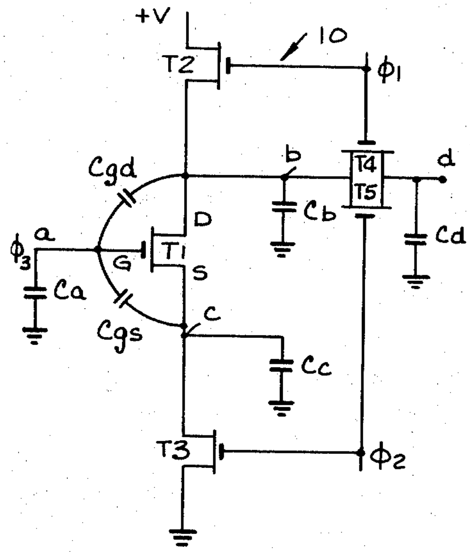
FIG. 1 PRIOR ART
FIGS. 1 and 2 are respectively a schematic diagram of a prior art inverter and a multiwaveform diagram useful in explaining the inverter shown in FIG. 1.

The novel features of the present invention and its advantages may best be explained by first highlighting the disadvantages and limitations of the prior art. FIG. 1 is a schematic diagram of a conventional MOS type inverter 10 of the prechargable-conditionally dischargable type. It includes a MOS element T1 whose gate (G) is connected to an input node *a*, whose drain (D) is connected to an internal node *b*, and whose source (S) is connected to an internal node *c*. Node *b* is assumed to be connected to a potential +V through a MOS element T2, while node c is connected to a reference potential such as ground through MOS element T3. Parallel MOS elements T4 and T5, which form a lateral transfer unit, connect node *b* to node d which represents the inverter's output node. This node may represent an input node, such as node *a*, of a succeeding circuit.

Each of the nodes is shown coupled to ground through its respective capacitor designated C with the node's designation as a subscript. Also shown are the parasitic capacitors of MOS element T1, which are designated by $C_{gd}$ and $C_{gs}$. For explanatory purposes it will be assumed that the MOS elements are of the *n* type so that a positive potential such as +V at a gate enables the MOS element or turns it ON, thereby providing a low resistive path between its drain and source to enable current flow in either direction. The gate is assumed to be disabled or OFF when the gate is at a low potential, such as ground. The high or enabling potential is assumed to represent a binary 1 or simply a 1, while ground potential is assumed to represent a binary 0, or simply a 0.

In FIG. 1, elements T2 and T4 are assumed to be turned ON during phase $\phi_1$, and elements T3 and T5 are assumed to be turned ON during phase $\phi_2$. For explanatory purposes it is assumed that during phase $\phi_3$ the inverter's input, represented by node *a*, is driven to either a 1 or a 0 depending on the binary input to the inverter. MOS element T1 represents a control MOS element since it is supplied with a controlling input binary data signal. Elements T2 and T4 can be thought of as the precharging MOS elements and elements T3 and T5 can be thought of as the conditionally discharging MOS elements.

In practice, capacitor $C_b > C_c$. For proper operation it is important that capacitor $C_a$ be much larger than the parasitic capacitors, such as $C_{gd}$. Generally, it is desirable that $C_a$ be at least three to five times as large as $C_{gd}$. This is often not the case unless $C_a$ is purposely increased in size, which reduces the circuit's density and speed. Typically, $C_{gd}$ is in the range of 0.02pf and $C_a$ is in the range of 0.06pf for a 3:1 ratio. This ratio is further reduced in any meaningful fan out in which the input node a serves as the input to a plurality of control MOS elements, such as T1, of a plurality of inverters. In such a case the parasitic capacitors $C_{gd}$ of the various control MOS elements are connected in parallel so that the total value of $C_{gd}$ equals and in most instances is greater than $C_a$. Herebefore, to overcome the total capacitance of all the parasitic capacitors in the fan out $C_a$ had to be made very large to maintain the desired capacitance ratio between the input capacitor $C_a$ and the total parasitic capacitance, which is a major disadvantage since it reduces circuit's density and speed.

Figure 2:
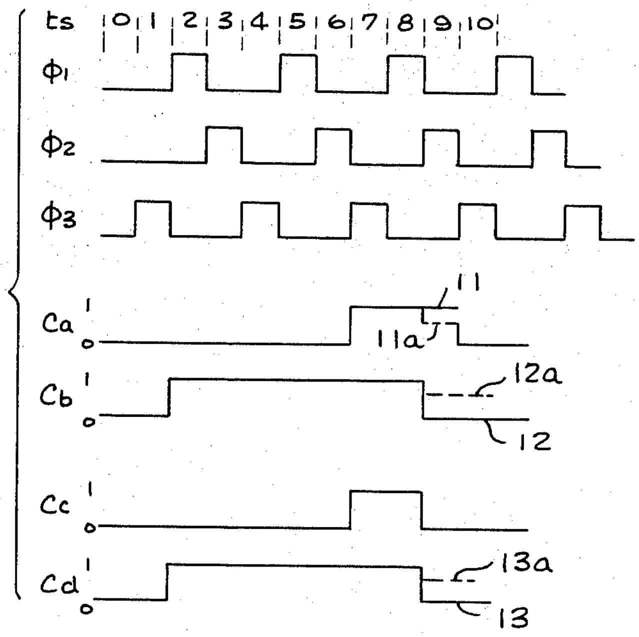
FIG. 2 PRIOR ART

The reason for the requirement that $C_a$ be much larger than $C_{gd}$ may best be explained by considering the operation of the prior art inverter 10 of FIG. 1, assuming that $C_a$ is only slightly greater than $C_{gd}$ or equal or smaller than $C_{gd}$. The operation of the inverter will be explained in conjunction with FIG. 2. In FIG. 2, $\phi_3$ is applied at time slots (*ts*) 1, 4, 7 and 10, $\phi_1$ at *ts*2, 5, 8 and $\phi_2$ at *ts*3, 6 and 9.

Let it be assumed that prior to *ts*1, all the capacitors are discharged so that all the nodes are 0's. It is also assumed that during *ts*1, $\phi_3$ node *a* is driven to a 0. Thus, T1 is OFF. At *ts*2, during which $\phi_1$ represents the precharging phase, T2 and T4 are turned ON, so that $C_b$ and $C_d$ are charged to a 1. $C_c$ remains discharged at 0 since T1 is OFF. At *ts*3 $\phi_2$, which represents the discharging phase, enables T3 and T5. However, since T1 is OFF there is no discharge path to ground and, therefore, $C_b$ and $C_d$ remain charged at 1. At *ts*4 another 0 is applied to node *a* during $\phi_3$. At *ts*5, $\phi_1$ again enables T2 and T4 to charge nodes $C_b$ and $C_d$ to a 1. However, since they are already at a 1, their charge does not change. Similarly, at *ts*6, $\phi_2$ enables T3 and T5. However, since T1 remains OFF ($C_a$ is a 0) no discharge path to ground is available, and $C_b$ and $C_d$ remain a 1.

Let it be assumed that the 0 applied to node a at *ts*4 is followed by a 1 at *ts*7. Thus, at *ts*7 $C_a$ charges up to a 1, turning T1 ON. Since $C_b$ is charged to a 1 and $C_c$ which is much smaller than $C_b$ is at a 0, when T1 is turned ON, some of the charge of $C_b$ charges $C_c$ to a 1. Then, at *ts*8 $\phi_1$ enables T2 and T4 to charge up $C_b$ and $C_d$ to +V or a 1. However, since they are already at a 1, no change takes place. At *ts*9, $\phi_2$ turns T3 and T5 ON. T3 provides a direct discharge path for $C_c$ which discharges to a 0. Also, as long as T1 is ON and T3 and T5 are ON during *ts*9, a discharge path is provided for $C_b$ through serially connected T1 and T3. Similarly, a discharge path is provided for $C_d$ through serially connected T5, T1 and T3.

Unless $C_a >> C_{gd} + C_{gs}$, during $\phi_2$ when nodes *b* and *c* are discharged to ground some of the charge of $C_a$ is coupled out to ground through the parasitic capacitors $C_{gd}$ and $C_{gs}$. Consequently, a condition often arises in which enough charge of $C_a$ is coupled out to ground so that node a or the gate of T1 is no longer at a level high enough or above threshold, needed to maintain T1 ON. When this occurs T1 is turned OFF, interrupting the discharge path to ground for $C_b$ and particularly for $C_d$. As a result, $C_b$ and $C_d$ are not fully discharged to 0 as is required. Rather, they often remain at high enough a level so that $C_d$ or output node *d*, which may serve as the input node to a subsequent circuit, can be assumed to be at a 1 level when a 0 level is desired. Thus, a malfunctioning or an error occurs due to the coupling out of charge from the gate capacitor $C_a$ of control MOS element T1. In FIG. 2, the desired binary levels of $C_a$ and $C_b$, and $C_d$ during *ts*9 are shown by solid lines 11, 12 and 13 respectively, while their levels in case sufficient charge from $C_a$ is coupled out so that T1 is turned OFF are represented by lines 11*a*, 12*a* and 13*a*, respectively.

Herebefore, this undesired malfunction of the inverter whenever a 0 input is followed by a 1 could only be overcome by making $C_a$ much larger than the total of all the stray capacitors of the control gates which are coupled thereto, to minimize the amount of charge which is coupled out of $C_a$. As previously indicated, the requirement of large gate capacitors at the gates of control MOS elements is most disadvantageous. It is the primary object of the present invention to enable the proper operation of a circuit, such as the inverter of FIG. 1 without the need for a large gate or input capacitor $C_a$.

Briefly, in accordance with the present invention, the basic inverter is provided with an additional MOS element which is enabled by the phase during which the input capacitor $C_a$ is charged to a 1 or a 0. In FIG. 1, this is assumed to be $\phi_3$. The additional MOS element is placed in parallel with T3 so that if during $\phi_3$, $C_a$ is charged to a 1, T1 which is ON during $\phi_3$, together with the additional MOS element provide a discharge path to ground for $C_b$ and $C_c$. Then, when $C_b$ and $C_c$ are precharged during the subsequent phase $\phi_1$, some charge is coupled into $C_a$ through the parasitic capacitors $C_{gd}$ and $C_{gs}$. Consequently, the charge of $C_a$ rises to a level above the 1 value. This is followed by the conditional discharging of $C_b$, $C_c$ and $C_d$ during the subsequent phase $\phi_2$. During this phase just like in the prior art, while $C_b$, $C_c$ and $C_d$ are discharged to ground, some charge is coupled out of $C_a$. However, since during the prior phase $\phi_1$, its charge was raised to above the 1 level, even though some charge is coupled out of it, the final charge which remains on $C_a$ at the end of $\phi_2$ is that which represents a 1. Consequently, the control element T1 remains ON, thereby enabling the full discharge of $C_b$ and particularly $C_d$.

Alternately stated, during $\phi_3$ when $C_a$ is charged to a 1 or +V, $C_b$ and $C_c$ are discharged to a 0 or ground. During $\phi_1$ while $C_b$ and $C_c$ (also $C_d$) are charged to a +V, $C_a$ is charged to (1+X)V, where X represents the charge coupled into $C_a$ during $\phi_1$. Then during $\phi_2$, $C_b$, $C_c$ and $C_d$ are discharged to ground and $C_a$ is partially discharged from (1+X)V to +V. The invention may be viewed as the provision of an additional element (T6) which enables the predischarging of all internal nodal capacitors ($C_b$ and $C_c$) when the input capacitor of the control MOS element (T1) is precharged to a 1. As a result, during precharging ($\phi_1$) of the nodal capacitors, charge is coupled into the input capacitor. Substantially the same amount of charge is coupled out of the input capacitor during a subsequent discharge phase ($\phi_2$), so that the net charge on the input capacitor and, therefore, the state of the control MOS element is not affected by the charges which are coupled in and out of the input capacitor, through the parasitic capacitors. Thus, the adverse effect of these capacitors is eliminated. Since their effect is eliminated a relatively small input capacitor $C_a$ can be employed without resulting in circuit malfunctioning.

Figure 3:
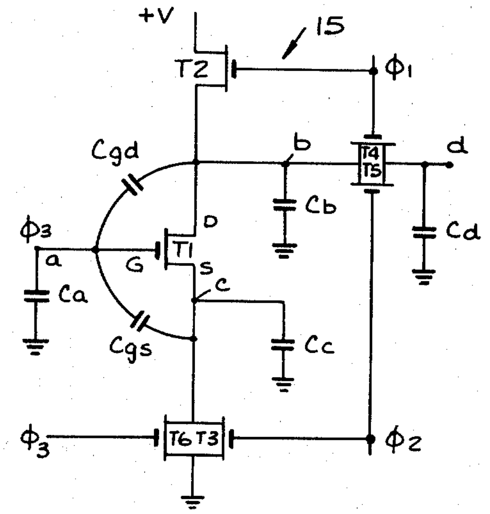
FIGS. 3 and 4 are respectively a schematic diagram of a novel inverter of the present invention, and a multiwaveform diagram useful in explaining its operation.

The present invention may further be explained by referring to FIG. 3 which is a diagram of an inverter 15 in accordance with the present invention. Therein, elements like those previously described are designated by like numerals. In FIG. 3, the additional MOS element is represented by T6 which is shown as being enabled by phase $\phi_3$, the same phase during which the input capacitor $C_a$ is preset to a 1 (or a 0). The operation of the novel inverter 15 may be summarized in conjunction with FIG. 4, which is similar to FIG. 2.

Figure 4:
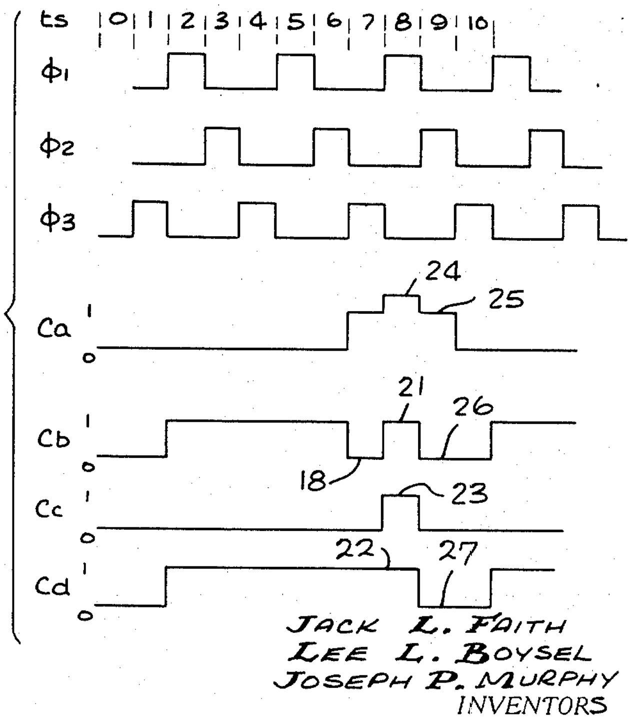

Basically, the operation of the novel inverter 15 is the same as that of the prior art inverter 10 during *ts*1–*ts*6. Then at *ts* 7, when $C_a$ is charged to a 1 by $\phi_3$ and T1 is turned ON, since the added element T6 is also turned ON by $\phi_3$, $C_b$ is discharged to a 0, as represented in FIG. 4 by line 18. Then, during the subsequent precharging phase $\phi_1$ at *ts*8 both T2 and T4 are turned ON, thereby charging up $C_b$ to a 1 as represented by line 21. Since $C_d$ is already charged to a 1, it remains charged to a 1, as represented by line 22. Also, since T1 is ON, $C_c$ charges up to a 1, as represented by line 23. As $C_b$ and $C_c$ charge up to a 1, some charge is coupled into $C_a$ through the parasitic capacitors $C_{gd}$ and $C_{gs}$, raising the charge on $C_a$ to a level above the 1 level, as represented by line 24. The added charge was previously referred to as XV.

As $ts9$ during $\phi_2$, T5 and T3 are turned ON, and since T1 is ON $C_b$ and $C_d$ discharge to a 0. Also $C_c$ discharges to a 0 through T3. During this discharging phase some charge is coupled out of $C_a$ through the parasitic capacitors. However, the final charge remaining on $C_a$ is for all practical purposes high enough to represent a 1, as shown by line 25. Consequently, T1 remains ON during the entire discharging duration ($ts9$), thereby enabling $C_b$ and $C_d$ to become fully discharged to a 0, as indicated by lines 26 and 27. From FIG. 4, it is apparent that during each $\phi_3$ time slot the binary level of $C_d$ is the complement of the binary level of $C_a$ during a preceding period. Thus, it is seen that the novel inverter 15 properly performs its logic function, which is not the case in the prior art inverter unless $C_a >> C_{gd}+C_s$.

Figure 5:
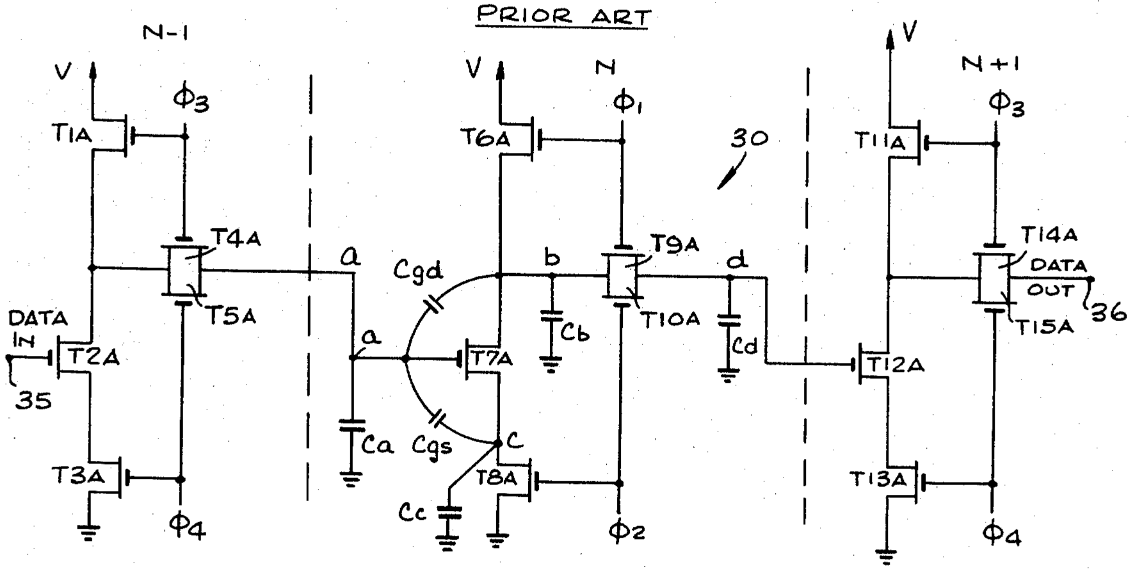
FIG. 5 PRIOR ART
FIGS. 5 and 6 are respectively a schematic diagram of a prior art shift register, and multiwaveform diagram useful in explaining its operation.
Figure 6:
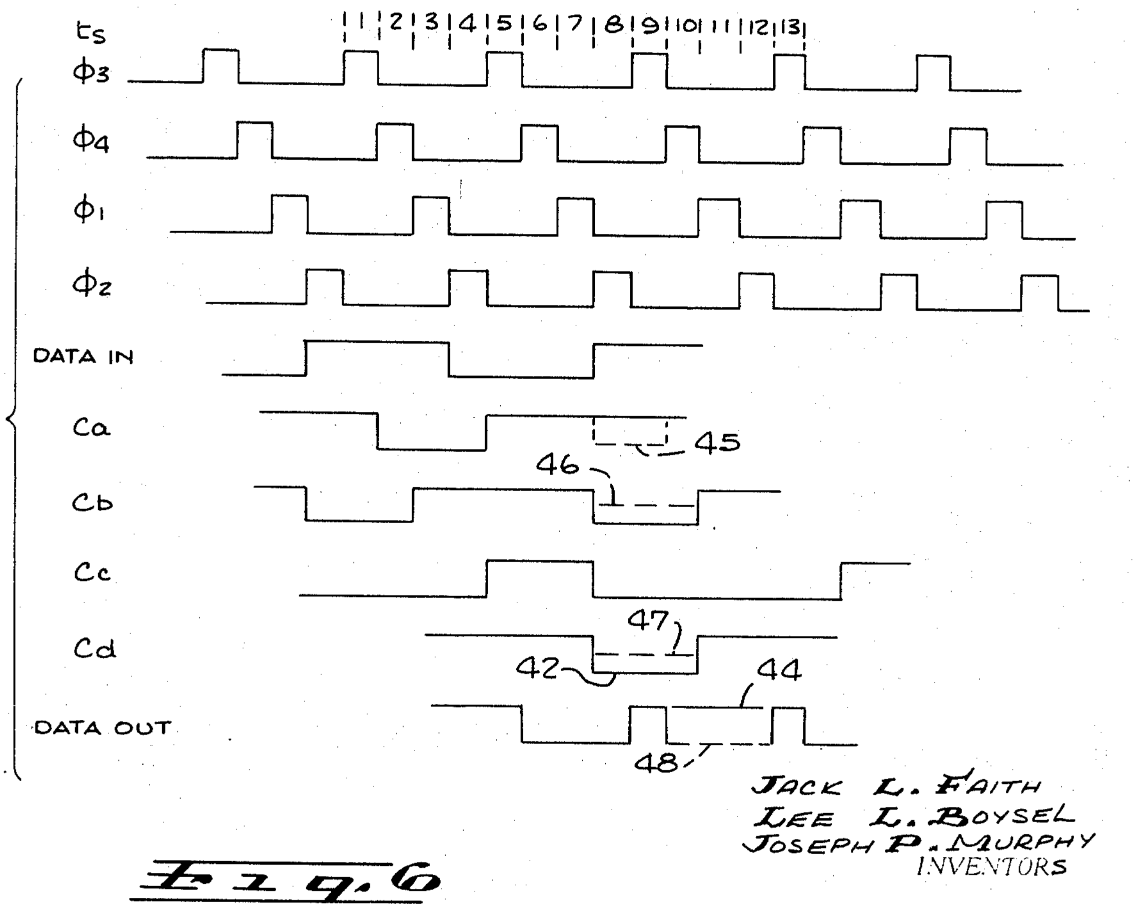
FIG. 6 PRIOR ART
Figure 7:
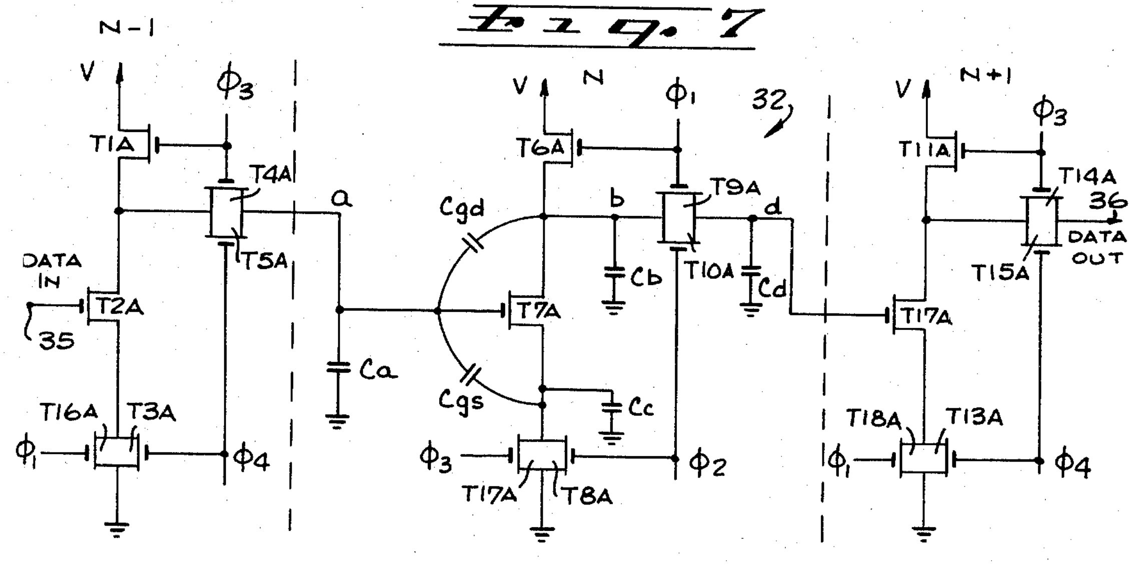
FIGS. 7 and 8 are respectively a schematic diagram of a novel shift register and a multiwaveform diagram useful in explaining its operation.
Figure 8:
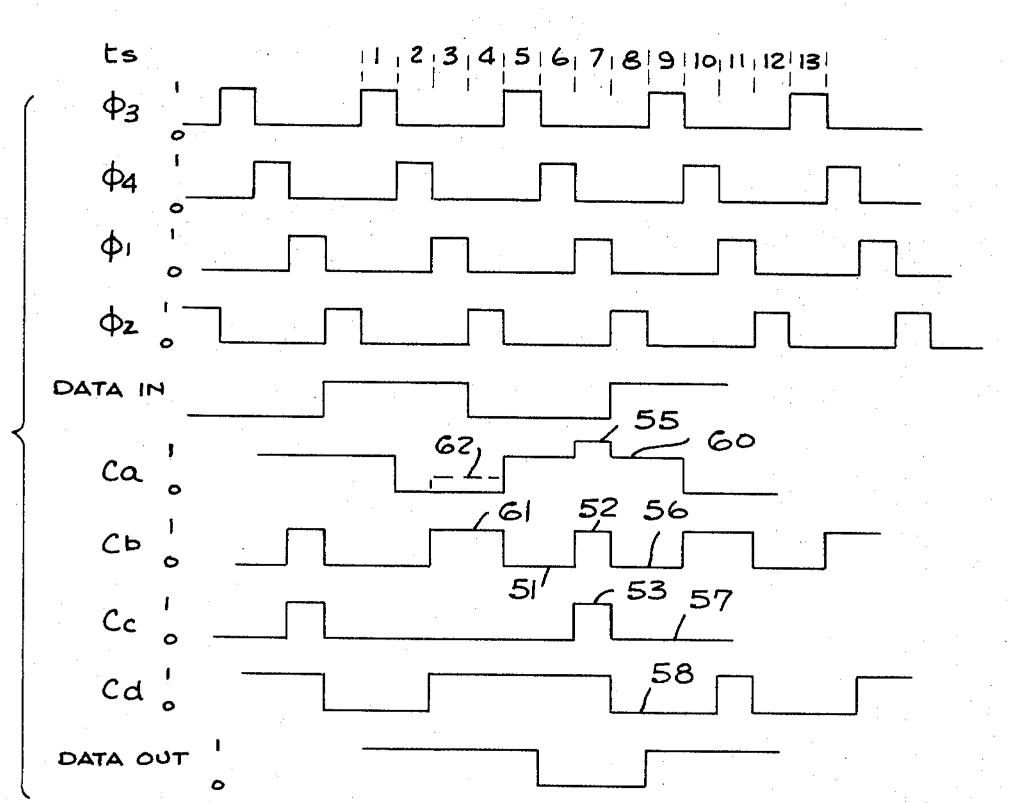

The novelty and advantages of the present invention may further be highlighted by comparing the operation of a conventional four-phase shift register, comprising a sequence of inverters, with an analogous shift register with additional MOS elements, in accordance with the present invention. A conventional shift register 30 is shown in FIG. 5 and its operation is represented by the waveforms of FIG. 6, while a novel shift register 32 is shown in FIG. 7 and its operation is highlighted by the waveforms in FIG. 8. Each shift register is shown comprising three successive inverters N−1, N and N+1. In the following explanation emphasis will be placed on the operation of inverter N.

As shown in FIG. 5, the three inverters comprise MOS elements T1A–T15A. DATA IN is assumed to be applied to an input terminal 35 and DATA OUT is provided at an output terminal 36. Let it be assumed that due to the DATA IN $C_a$ of inverter N is charged to a 0 during $ts2$–$ts4$ and, thereafter it is charged to a 1 during $ts5$–$ts7$. That is, the input to inverter N is a 0 followed by a 1. As seen, $C_b$ is a 1 when during $ts5$, $C_a$ becomes a 1. Consequently, during $ts7$ when $\phi_1$ enables element T6A to precharge $C_b$ to a 1 since it is already a 1, no current flows through T6A and, therefore, no charge is coupled into $C_a$ through the parasitic capacitors.

During $ts8$ when $C_b$ and $C_d$ are conditionally discharged, by $\phi_2$ enabling T8A and T10A, it is desired that they become fully discharged to a 0 as represented by lines 41 and 42. Also, $C_c$ is discharged through enabled T8A. If $C_d$ were fully discharged to a 0 as represented by line 42, the DATA OUT at terminal 36 would be a 1 during $ts10$–$ts12$ as represented by line 44. However, in the prior art due to the coupling out of charge from $C_a$ through the parasitic capacitors, quite often the charge on $C_a$ falls below the threshold level, needed to hold T7A in the ON state, as indicated by dashed line 45. Consequently, if T7A turns OFF the discharge path for $C_b$ and $C_d$ is interrupted and they may remain charged to about a 1 level, as represented by lines 46 and 47. When $C_d$ remains charged to a 1, T12A remains ON and, therefore, during $ts10$–$ts12$, the DATA OUT is a 0 as represented by dashed line 48, rather than the desired 1, as represented by line 44.

Such improper performance is eliminated in the novel shift register 32 by adding MOS elements T16A, T17A and T18A to inverters N−1, N and N+1, respectively, as shown in FIG. 7. T17A, associated with inverter N of interest, is enabled during $\phi_3$ when $C_a$ is precharged by enabled elements T1A and T4A. T16A and T18A are enabled during $\phi_1$.

Again let it be assumed that during $ts2$–$ts4$, (see FIG. 8) $C_a$ is charged to a 0 followed by a charge of a 1 during $ts5$ and a few subsequent time slots. During $ts5$ when $C_a$ is charged to a 1, thereby enabling T7A, T17A is also turned ON. Consequently, $C_b$ discharges to a 0 as represented by line 51. Then during $ts7$, $\phi_1$ enables T6A and T9A. T6A provides a charge path for $C_b$ and it together with T7A, which is ON, provide a charge path for $C_c$. Thus, both $C_b$ and $C_c$ are charged to 1's, as represented by 52 and 53. $C_d$ which was already charged to a 1 remains a 1. As $C_b$ and $C_c$ are charged to a 1, some charge is coupled to $C_a$ through $C_{gd}$ and $C_{gs}$, thereby raising its charge to above the 1 level, as represented by line 55. Then during $ts8$ when $\phi_2$ enables elements T10A and T8A, all three capacitors $C_b$, $C_c$ and $C_d$ discharge to a 0 as indicated by lines 56, 57 and 58. Also, some charge is coupled out of $C_a$. However, the remaining charge is sufficient to define a 1 as represented by line 60, and thereby maintain T7A ON for the complete discharge of $C_b$ and $C_d$. Since during $ts8$, $C_d$ becomes fully discharged to a 0, during subsequent ts10–ts12 the output terminal 36 remains at a 1 level, as desired, rather than the 0 level as in the malfunctioning prior art shift register.

From the foregoing it should thus be appreciated that the advantages of the invention are achieved by providing each inverter of shift register 32 with an additional MOS element, such as element T17A in inverter N. T17A is enabled or turned ON by the phase, such as $\phi_3$, during which the inverter's input capacitor $C_a$ or input node a is precharged to a 1. By providing the additional element T17A, when the control element T7A is turned ON during $\phi_3$ it, together with T17A, which is turned ON by the same phase $\phi_3$, predischarge the internal capacitors $C_b$ and $C_c$ at the internal nodes *b* and *c*. Then, during a subsequent phase $\phi_1$, these capacitors are precharged, during which some charge is coupled into the input capacitor to raise its charge to a level above the 1 level. This is followed by a conditional discharge phase $\phi_2$. If during $\phi_2$ T7A is ON, the internal nodal capacitor $C_b$ and the output capacitor $C_d$ are discharged to a 0, since during $\phi_2$ T10A and T8A are also turned ON. $C_b$ discharges through T7A in series with T8A, and $C_d$ discharges through serially connected T10A, T7A and T8A. It should be pointed out that during this discharge phase $\phi_2$, $C_c$ is also discharged through T8A.

During this discharge phase $\phi_2$, some charge is coupled out of $C_a$ through the parasitic capacitors. However, since previously during $\phi_1$ its charge was raised to above the 1 level, even though some charge is coupled out, sufficient charge remains in the input capacitor to maintain node a at the 1 level and, thereby, keep T7A ON. This enables $C_b$ and particularly $C_d$ to become fully discharged to the 0 level. Thus, the present invention may be thought of as an inverter type circuit with an input node (such as node *a*) connected to a control MOS element T7A and at least one internal node *b* and an output node *d*. The circuit includes a MOS element T7A which enables the internal node *b* to be predischargeable during the phase $\phi_3$ when the input node a is conditionally precharged to a 1. During a phase $\phi_1$, subsequent to the predischarging phase, the internal node $b$ and the output node $d$ are precharged to a 1. Then during a succeeding phase $\phi_2$, the internal and output nodes are conditionally discharged to a 0 only if the input node $a$ is at a 1 level and, therefore, the control element is turned ON. If, however, the input node $a$ is at a 0 level and the control element is OFF, the internal node and more importantly the output node remains charged to a 1 level.

Herebefore, the coupling of charge into $C_a$ during the phase, such as $\phi_1$, when $C_b$ and $C_d$ are precharged has been described only in conjunction with cases in which $C_a$ was assumed to be charged to a 1. It should be appreciated that when $C_b$ and $C_d$ are precharged, some charge is coupled into $C_a$ when $C_a$ is charged either to a 0 or a 1. For example, in the novel shift register 32 (FIG. 7) at *ts*3 when $C_b$ is precharged, as represented by line 61 in FIG. 8, even though $C_a$ is at a 0 level, some charge may be coupled thereinto to raise its level as indicated by dashed line 62. Generally, the coupled charge is not sufficient to raise the level across $C_a$ to the threshold level, needed to turn ON the control element T7A. If, however, the coupled charge is high enough to approach the turn-on threshold level, means have to be provided to effectively couple node a to ground, if this node is discharged, during the precharging of the capacitors $C_b$ and $C_d$, in order to prevent charge from accumulating in the discharged input capacitor $C_a$. Otherwise the control element may be turned ON when it should remain in its OFF state. In the present example, this may be accomplished by connecting node $a$ to ground during $\phi_1$ only when $C_a$ is at the 0 level.

Figure 9:
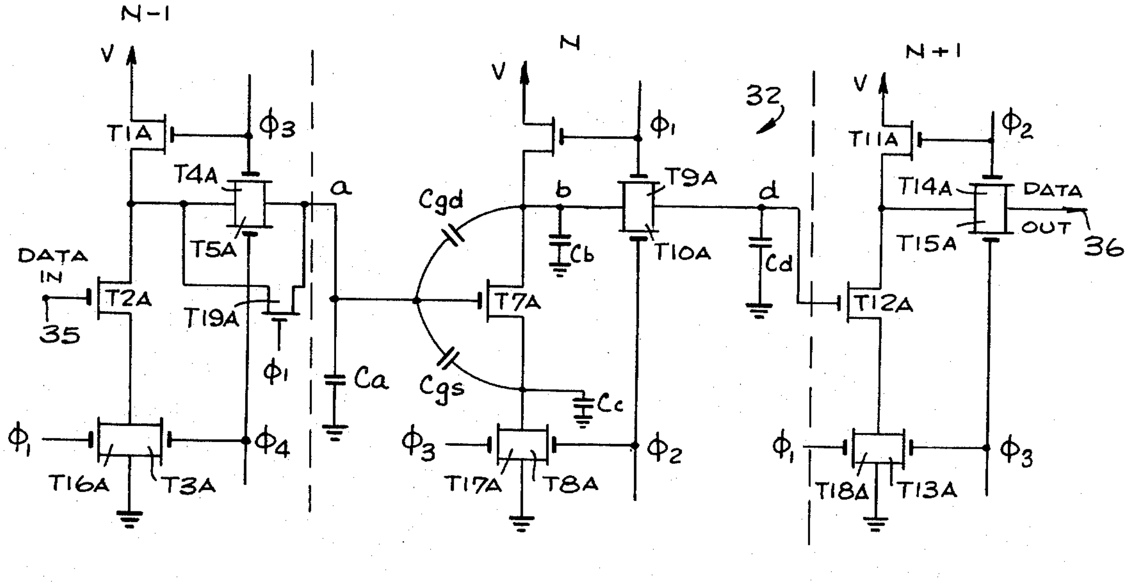
FIGS. 9 through 13 are schematic diagrams of different embodiments of the invention.

An arrangement which accomplishes this end is shown in FIG. 9 which is similar to FIG. 7 exept that it includes additional MOS element T19A. Element T19A, which is turned On at $\phi_1$ when $C_b$ and $C_d$ of stage N are precharged, is connected in series with T2A and T16A of the preceding inverter N−1. It should be pointed out that prior to $\phi_1$, i.e., during $\phi_4$, $C_a$ becomes a 0 only if during $\phi_4$ T2A in ON. Consequently, by providing T19A in series with T2A and T16A during $\phi_1$ both T19A and T16A are turned ON, and if T2A is turned ON, i.e., $C_a$ is a 0, node a is effectively connected to ground. As a result, no charge can be coupled into the $C_a$, which is shorted out to ground, during the precharging phase $\phi_1$ T2A is OFF $C_a$ remains charged to a 1. Consequently, when during $\phi_1$ even though T19A and T16A are turned ON, node a is not connected to ground, since T2A is OFF.

It is appreciated that in accordance with the teachings of the present invention one or more MOS elements are added to the prior art type inverter to eliminate malfunctioning without increasing the size of the input capacitor. In any practical MOS/LSI circuit, the addition of a few MOS elements represents an insignificant reduction in circuit density as compared with the significant reduction of circuit density in the prior art, in which large input capacitors are required to prevent malfunctioning.

Herebefore, the invention has been described in connection with a simple inverter and a multiinverter shift register. It should be appreciated that the teachings of the present invention may be employed in other circuit arrangements with MOS elements and multiphase clocking in which nodal capacitor precharging and nodal capacitor conditional discharging is employed, in the performance of various logic functions. For example, the teachings may be employed in a circuit in which the basic inverter is modified to form a NOR gate, as shown in FIG. 10, or a NAND gate, as shown in FIG. 11.

Figure 10:
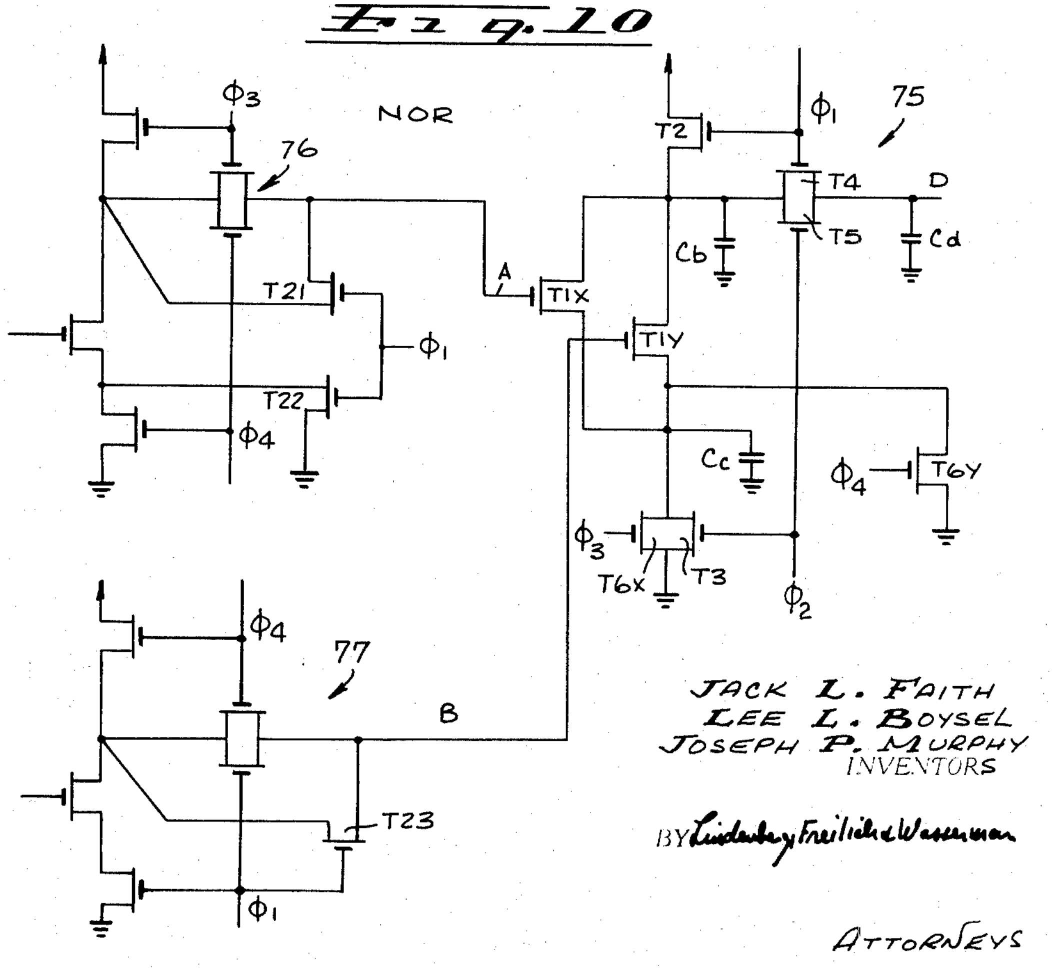

The NOR gate, designated by numeral 75 in FIG. 10, is in effect an inverter such as inverter 15, except that the single control MOS element T1 is replaced by two control MOS elements T1X and T1Y, which are connected in parallel. The other elements are designated by numerals like those used in FIG. 3. It is assumed that the gate of T1X is precharged to a 1 during $\phi_3$ from a preceding inverter 76 while the gate of T1Y is precharged to a 1 during $\phi_4$ from another preceding inverter 77. The inputs to elements T1X and T1Y are also designated A and B respectively. In NOR gate 75 elements T2 and T4, which are turned ON during $\phi_1$ to precharge $C_b$ and $C_d$, and elements T3 and T5, which are turned ON to provide a conditional discharge path for $C_d$ and the rest of the capacitors, if either control MOS element is ON, represent elements which are part of the prior art NOR gate. However, the novel NOR gate 75 includes additional elements T6X and T6Y, which are turned ON during $\phi_3$ and $\phi_4$, respectively. It is elements T6X and T6Y which are added to the conventional NOR gate to form the novel NOR gate in accordance with the present invention.

Basically, T6X is turned ON during $\phi_3$ when T1X is turned ON. Thus, the two elements provide a discharge path to ground for all internal nodal capacitors, such as $C_b$ and $C_c$. Similarly, T6Y is turned ON during $\phi_4$ when T1Y is turned ON. Consequently, a path to ground is provided for all internal nodal capacitors to prevent some charge from being coupled thereinto through the parasitic capacitors of T1Y when the latter is turned ON. Then, during $\phi_1$ at least $C_b$ and $C_d$ are precharged to a 1. When they are precharged some charge is coupled into the input capacitors at the gates of control MOS elements T1X and T1Y, through the parasitic capacitors (not shown) of these elements. If either is a 1 its gate voltage rises above the 1 level. Then, during $\phi_2$ when the capacitors and particularly $C_d$ are conditionally discharged, even though some charge is coupled out of the gate capacitor of T1X and T1Y if either is ON, the element remains ON during the entire $\phi_2$ phase or period for the complete discharge of $C_d$. It should be apparent that after $\phi_2$ point D, i.e., the output node, is a 1 only if the inputs to both T1X and T1Y, designated A and B respectively, are 0's. Otherwise, if either A or B is a 1, $C_d$ discharges during $\phi_2$ and, therefore, D is a 0. Thus, the logic function performed by the inverter may be expressed as $D=A+B$.

Figures 11, 12:
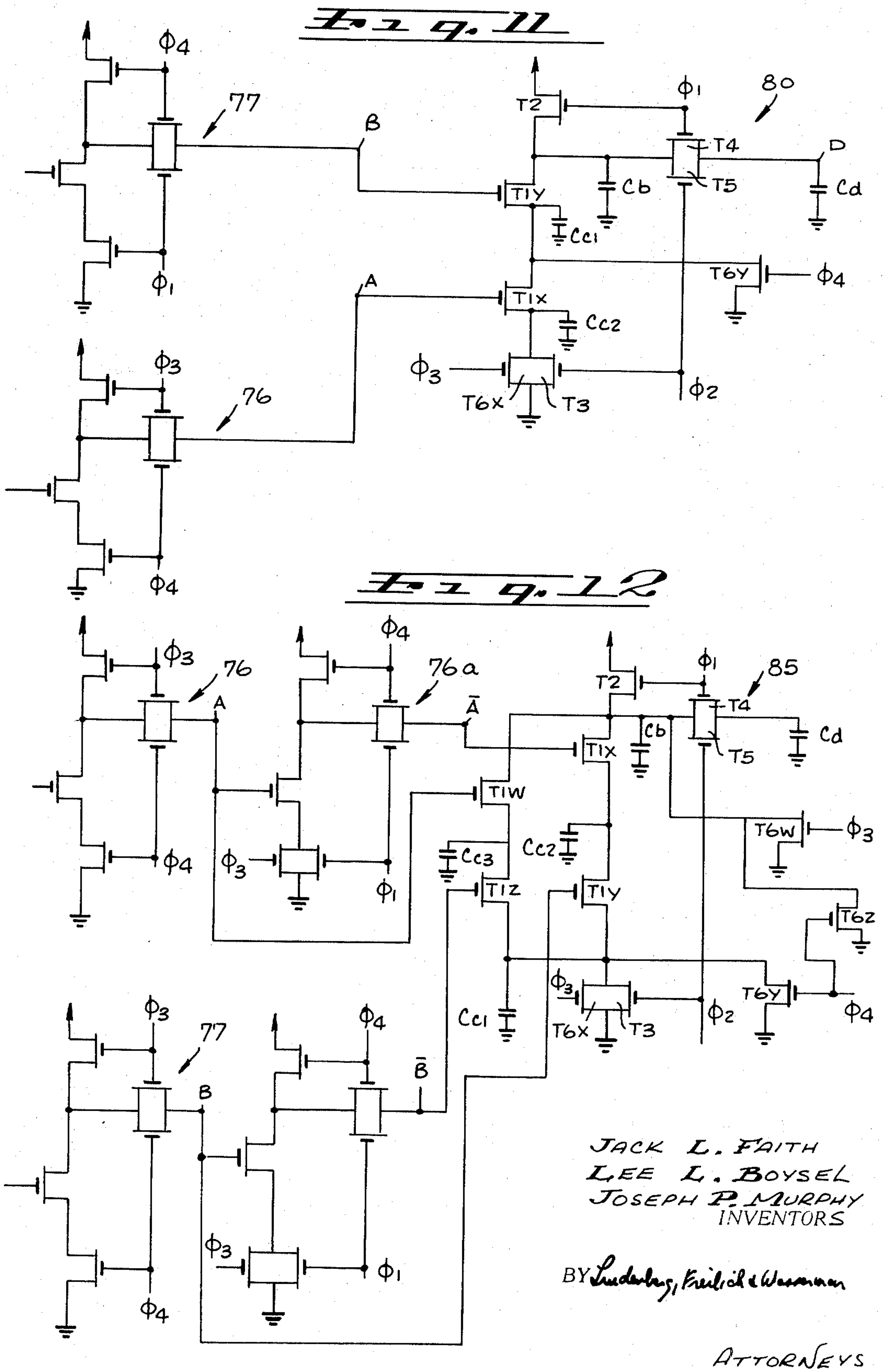

The NAND gate 80, shown in FIG. 11, is very similar to the NOR gate 75 of FIG. 10, except that in the former the two control MOS elements T1X and T1Y are connected in series rather than in parallel between MOS elements T2 and T3. It should be pointed out that the NAND gate 80 includes two internal nodal capacitors $C_{c1}$ and $C_{c2}$, in addition to nodal capacitor $C_b$ and the output capacitor $C_d$. Basically, a nodal capacitor is formed between ground and the junction point between two or more MOS elements. The two MOS elements which are added to the conventional NAND gate in accordance with the present invention are, as in the case of NOR gate 75, T6X and T6Y. During $\phi_3$ when T1X is turned ON by having its gate capacitor precharged to 1, T6X is turned ON, thereby providing a discharge path for $C_{C1}$ and $C_{C2}$. Then, during $\phi_4$ when T1Y is turned ON T6Y is also turned ON, to provide a discharge path for $C_b$ and to prevent $C_{C1}$ from becoming partially charged through the gate to source stray capacitance of T1Y, as the input or gate capacitor of T1Y is charged to a 1. It should be appreciated that the logic performed by NAND gate 80 may be expressed by $\overline{D}=A\cdot B$.

FIG. 12 to which reference is now made is a schematic diagram of a NXOR gate 85 with four control MOS elements T1W, T1X, T1Y and T1Z, assumed to be activated by inputs A, $\overline{A}$, B and $\overline{B}$ from inverters 76, **76*a*, 77 and 77*a*, respectively. T1W and T1Y are assumed to be turned ON during $\phi_3$ and T1X and T1Z are assumed to be turned ON during $\phi_4$. The gate 85 defines, in addition to $C_b$ and $C_d$, three additional internal nodal capacitors $C_{C1}$, $C_{c2}$ and $C_{c3}$. Basically, gate 85**, in addition to the conventional MOS elements T1W–T1Z and T2–T5, includes four additional MOS elements T6W–T6Z. Elements T6X and T6W are turned ON during $\phi_3$. T6X provides a direct discharge path for $C_{c1}$ and, since T1Y is turned ON during $\phi_3$, $C_{c2}$ is discharged through T1Y and T6X. T6W provides a direct discharge path for $C_b$ and, since during $\phi_3$ T1W is turned ON, $C_{c3}$ is discharged through T1W and T6W. Elements T6Y and T6Z are turned ON during $\phi_4$ to prevent any of the internal nodal capacitors from becoming partially charged through the parasitic capacitors when T1X and T1Z are turned ON during $\phi_4$. As a result, all the nodal capacitors are fully discharged prior to $\phi_1$, when precharging takes place.

It should be stressed that in each of the gate circuits, shown in FIGS. 10–12, in each inverter which feeds a control MOS element, one or more additional elements need be provided (such as T19A in FIG. 9) in order to effectively couple the gate capacitor of the control MOS element to ground during the precharging phase of the gate circuit, such as phase $\phi_1$ in FIG. 12, if prior to the precharging phase the gate capacitor has been discharged to ground. As previously pointed out this may be necessary to insure that a charge is not coupled into a previously discharged gate capacitor of a control MOS element during the precharging phase. From the foregoing description the locations of these additional MOS elements in the various feeding inverters should be obvious to those familiar with the art. Thus, most of them are deleted from FIGS. 10–12. However, three such elements are shown in FIG. 10. They are designated by T21–T23. All of them are enabled during $\phi_1$ when the nodal capacitors of the NOR gate are precharged.

Figure 13:
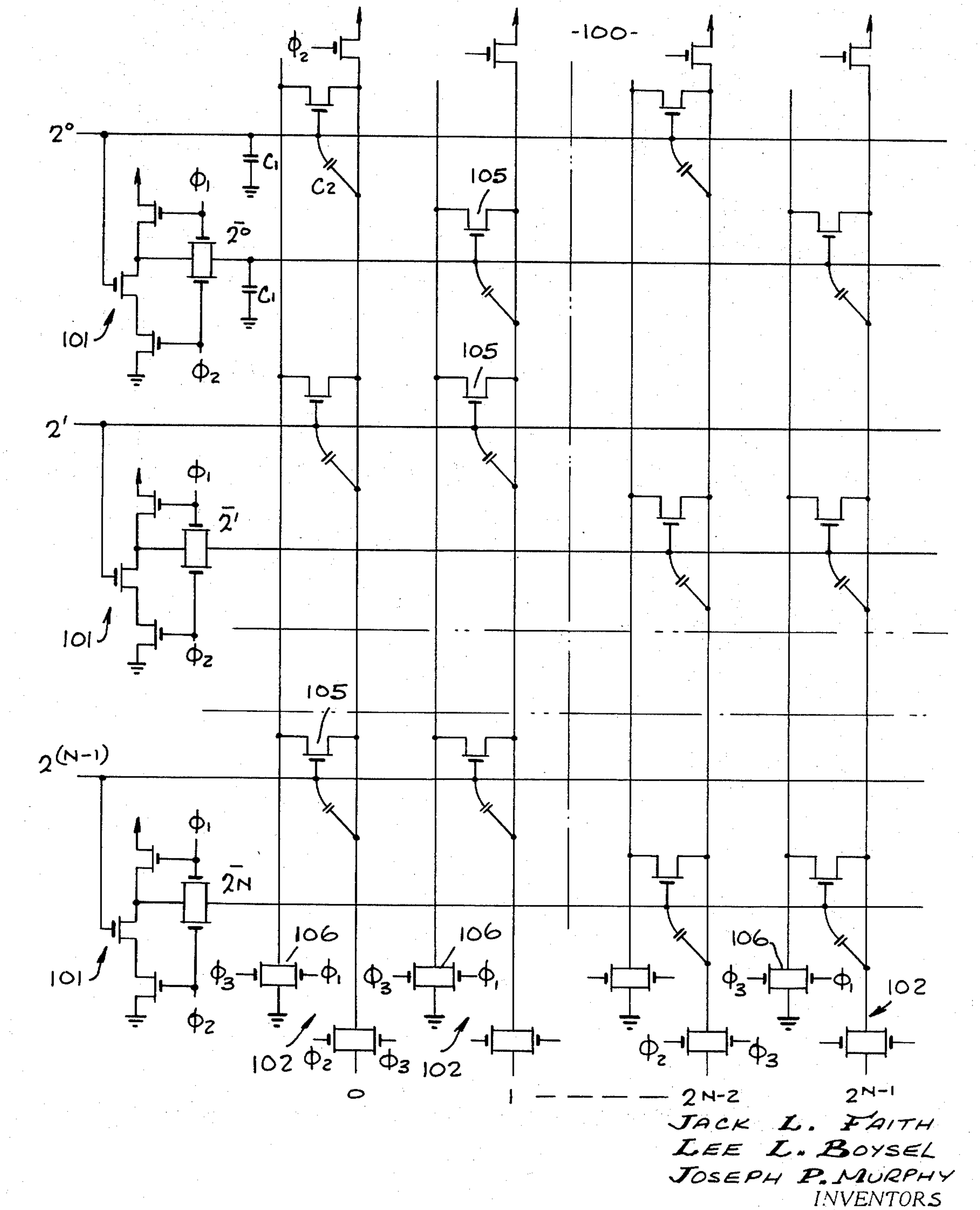

The advantages, realized from the present invention, may be summarized in conjunction with FIG. 13 which is a schematic diagram of a decoder 100 in which an input of N bits, provided on input lines $2^0$ through $2^{(N-1)}$, is converted into a single output on one of $2^N$ output lines, designated 0 through $2^N-1$. As in the prior art each input line has associated therewith an inverter 101, and each output line is connected to the various input lines and the inverters 101 through an inverter 102. Each inverter 102 includes a plurality of MOS control elements 105 which are connected to the various input lines and their inverters 101 so that for each bit combination of inputs a specific output line is at a 1 level and all the other outputs are at the 0 level. In FIG. 13, the input capacitors from the input lines and the inverters 101 are designated $C_1$ and the gate to drain parasitic capacitors of the various control elements 105 are designated $C_2$. In the decoder 100 the total parasitic capacitance connected to each $C_1$ is $C_T$ where $C_T=(N/2)\ C_2$. Assuming a parasitic capacitance of 0.015pf, $C_T=(N/2)$ (0.015)pf. Generally $C_1$ should be at least three times as great as $C_T$. Consequently, when N is quite large $C_1$ must be made to be quite large for proper operation. As previously stressed the need to make $C_1$ large is most disadvantageous since it greatly reduces circuit density.

This requirement is eliminated by the present invention by adding to each inverter 102 an additional MOS element 106, to provide a predischarge path for all the internal nodal capacitors of the inverter. In the present example since the output capacitors $C_1$ of the various input inverters 101 which serve as the input capacitors of inverters 102 are assumed to be precharged during $\phi_1$, elements 106 are turned ON during $\phi_1$. As a result, all internal nodal capacitors of inverters 102 are predischarged, for the reasons herebefore discussed. Thus, the addition of element 106 to each inverter 102 eliminates the need for large input capacitors $C_1$.

From the foregoing it is thus seen that the present invention provides significant improvements in multiphase clocked circuits employing MOS elements, in which internal nodal capacitors are first precharged and thereafter conditionally discharged for data transfer, or for the performance of various logic functions. All of the circuits effectively include at least one inverter type circuit which includes at least one control MOS element. Assuming one control MOS element, the inverter type circuit includes one additional MOS element which is turned ON when the control MOS element is turned ON to provide, together with the turned ON control MOS element, a predischarge path for all the internal nodal capacitors. Consequently, all the internal nodal capacitors are predischarged before the precharging phase. The predischarging of the nodal capacitors eliminates the effect of the parasitic capacitors of the control MOS elements, as previously explained. This is the case since during precharging the amount of charge, coupled into the input or gate capacitor of the control MOS element, is substantially equal to the amount of charge coupled out of the same gate capacitor during the subsequent conditional discharging phase. Therefore, the state of conduction of the control MOS element is not affected by the charge which is coupled in andout of its gate capacitor through the parasitic capacitors, during the precharging and the conditional discharging phases, respectively.

For identification purposes the additional MOS element may be defined as the predischarge control MOS element. Herebefore, it has been assumed that the predischarge control MOS element (T6 in FIG. 3) is turned ON during the phase $\phi_3$ that the control MOS element (T1) is precharged, so that just prior to precharging all internal nodal capacitors are fully discharged. This is a preferred arrangement. It should be stressed however that some of the advantages of the invention may be realized by predischarging the internal nodal capacitors prior to the time that all control MOS elements are turned ON. In such a case the charge which is coupled into the gate capacitor of a control MOS element during precharging is less than the charge which is coupled out during subsequent conditional discharging. However, the difference may be small so as not to affect the state of conduction of the control MOS element.

For example, let it be assumed that in the NOR gate, shown in FIG. 10, element T6Y is not included. In such a case $C_b$ and $C_c$ are discharged to a 0 during $\phi_3$. During $\phi_4$ when T1Y is turned ON, since T6Y is excluded a predischarge path is not provided for $C_b$ and $C_c$. Consequently, some charge is coupled thereinto through the parasitic capacitors of T1Y. The charge supplied to $C_b$ and $C_c$ during $\phi_1$ when they are precharged to a 1 is less than the charge which is removed from them during the conditional discharge phase $\phi_2$. As a result, the amount of charge which is coupled into the gate capacitors of T1X and T1Y during $\phi_1$ is less than the coupled out charge during $\phi_2$. In some cases the difference may be small so as not to affect the turn-on status of T1X or T1Y. If, however, their turn-on status is affected, the preferred arrangement must be employed. That is, sufficient predischarge control MOS elements must be provided which are activated when various control MOS elements are turned on so that just prior to the precharging phase, all nodal capacitors are fully discharged.

In some practical applications it was discovered that most of the advantages of the invention are achieved even when the predischarge control MOS elements are turned ON prior to the precharging of the control MOS elements. Thus, generalizing the teachings disclosed herein, the predischarge control MOS elements need be enabled on or before the phase during which the control MOS elements are precharged. Alternately stated, the predischarge control MOS elements have to be turned ON not after the phase during which the input gates of the control MOS elements are precharged.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a multiphase clocked type inverter circuit of the type including a plurality of metal-oxide-semiconductor elements, definable as MOS elements, each element being switchable to an ON state when the potential at a gate terminal thereof is a first value, the element being in an OFF state when the gate potential is of a second value, said circuit including internal nodal capacitors and an output capacitor which are prechargable to said first value from a first reference potential at said first value during a first clocking phase and which are conditionally dischargable to a second reference potential of said second value during a subsequent second clocking phase, said circuit further including control MOS element means which include at least one control MOS element which is switchable to the ON state for at least a limited duration during a third clocking phase, preceding said first phase, the arrangement comprising:

at least one predischarging control MOS element switchable to the ON state not after said third clocking phase for providing a discharge path to said internal nodal capacitors to a reference potential of said second value, whereby said internal nodal capacitors are discharged to said second value before said first clocking phase.

2. The arrangement as recited in claim 1 wherein said circuit includes a first internal nodal capacitor which is connected to said first reference potential through a first MOS element which is switchable to said ON state during said first phase, a second internal nodal capacitor connected to said second reference potential through a second MOS element which is switchable to said ON state during said second phase, third and fourth MOS elements connected in parallel between said first nodal capacitor and said output capacitor, said third and fourth MOS elements being switchable to their respective ON states during said first and second phase respectively, with said control MOS element means being connected between said first and second internal nodal capacitors, and said at least one predischarging control MOS element being connected in series between said second reference potential and one of said internal nodal capacitors for providing a predischarge path for the nodal capacitor when said predischarging control MOS element is switchable to the ON state.

3. The arrangement as recited in claim 2 wherein said control MOS element means comprises a single control MOS element, connected between said first and second internal nodal capacitors and is switchable to said ON state during said third phase and said predischarging control MOS element is connected in series with said single control MOS element between said second reference potential and said first nodal capacitor and is switchable to said ON state during said third phase, whereby said first nodal capacitor is discharged to said second reference potential through said single control MOS element and said predischarging control MOS element and said second nodal capacitor is discharged to said second reference potential through said predischarging control MOS element during said third phase.

4. The arrangement as recited in claim 2 wherein said control MOS element means comprises a plurality of control MOS elements connected in parallel between said first and second internal nodal capacitors at least one of said control MOS elements being switchable to said ON state during said third phase and said predischarging control MOS element is connected in series with said control MOS elements between said second reference potential and said first nodal capacitor and is switchable to said ON state during said third phase, whereby said first nodal capacitor is discharged to said second reference potential through said at least one control MOS element and said predischarging control MOS element and said second nodal captor is discharged to said second reference potential through said predischarging control MOS element during said third phase.

5. The arrangement as recited in claim 2 wherein said control MOS element means include at least one group of control MOS elements connected in series between said first and second nodal capacitors and defining at least a third internal nodal capacitor, said control MOS elements being switchable to their respective ON state prior to said first phase, the circuit including a plurality of predischarging control MOS elements switchable to their ON states prior to said first phase for providing direct predischarge paths to said second reference potential for some of said nodal capacitors and for providing together with some of said control MOS elements which are ON predischarge paths for some others of said nodal capacitors; whereby prior to said first phase all of said nodal capacitors are substantially discharged to said second value.

6. The arrangement as recited in claim 2 wherein said control MOS element means include a plurality of control MOS elements connected in a preselected series-parallel combination between said first and second nodal capacitors and defining additional nodal capacitors therebetween, each MOS control element being switchable to an ON state prior to said first phase, the circuit including a plurality of predischarging control MOS elements switchable to their ON states prior to said first phase for providing direct predischarge paths to said second reference potential for some of said nodal capacitors and for providing, together with some of said control MOS elements which ON, predischarge paths for some others of said nodal capacitors, whereby prior to said first phase substantially all of said nodal capacitors are substantially discharged to said second value.

7. In an inverter type circuit of the type including a plurality of metal-oxide semiconductor elements, definable as MOS elements, including a precharging control MOS element switchable to an ON state during a first phase period to enable the precharging of at least some of internal nodal capacitors of said circuit, a conditional discharging control MOS element switchable to an ON state during a second phase, subsequent said first phase, at least one input data control MOS element, connected between said precharging control MOS element and said conditional discharging control MOS element, and being switchable to an ON state during a third phase preceding said first phase and conditionally remaining in said ON state or conditionally switchable to an OFF state as a function of binary data supplied thereto prior to said second phase, whereby during said second phase all of said internal nodal capacitors are discharged only if said at least one input data control MOS element is in the ON state, the improvement comprising:

at least one predischarging control MOS element switchable to an ON state not after said third phase for providing together with said input data control MOS element a discharge path for at least some of said internal nodal capacitors, whereby said internal nodal capacitors are discharged prior to said first phase.

8. The arrangement as recited in claim 7 wherein said one predischarging control MOS element is switchable to said ON state during said third phase.

9. The arrangement as recited in claim 7 wherein said input data control MOS element is conditionally switchable to said OFF state as a function of the data supplied thereto during a phase after said third phase and not subsequent said first phase.

10. The arrangement as recited in claim 9 wherein said one predischarging control MOS element is switchable to said ON state during said third phase.

11. The arrangement as recited in claim 7 wherein said input data control MOS element is conditionally switchable to said OFF state or remains in said ON state as a function of the data supplied thereto during a fourth phase subsequent said third phase and preceding said first phase.

12. The arrangement as recited in claim 11 wherein said one predischarging control MOS element is switchable to said ON state during said third phase.

13. The arrangement as recited in claim 12 further including means coupled to said input data control MOS element and switchable to said ON state during said first phase for maintaining said input data control MOS element in an OFF state only if during said fourth phase said input data control MOS element was switched to said OFF state.

14. An inverter type circuit for providing a binary output which is either a first value or a second value as a function of the binary values of n inputs, comprising:

a plurality of metal-oxide-semiconductor elements definable as MOS elements, each element being switchable to an ON state when the potential at a gate thereof is of said first value and is switchable to an OFF state when the gate thereof is of said second value;

a first source of reference potential;

a second source of reference potential;

first means for connecting a first of said elements between said first source and a first node;

second means for connecting a second of said elements between said second source and a second node;

*n* third elements connected between said first and second nodes n being an integer equal to at least 1;

a first nodal capacitor connected between said first node and said second source, said first element being switchable to said ON state during a first phase for precharging at least said first capacitor to said first source potential, and said second element being switchable to said ON state during a second phase following said first phase for providing at least said second capacitor with a discharge path to said second source, whereby said first capacitor is dischargeable to said second source when all serially connected third elements of at least one group of said third elements are in their ON state as a function of first value binary inputs applied thereto through said third elements which are in their ON state; and at least a fourth MOS element switchable to said ON phase prior to said first phase and connected to at least one of said nodes and to said second source for predischarging at least said capacitor connected to said one node prior to said first phase.

15. The arrangement as recited in claim 14 wherein $n=1$, the single third element being switchable to an ON state during a third phase preceding said first phase and being switchable to an OFF state or remaining in said ON state during a phase subsequent said third phase as a function of the binary level applied thereto during the phase subsequent said third phase, with said circuit including a single fourth element.

16. The arrangement as recited in claim 15 wherein said fourth element is switchable during said third phase, whereby said second capacitor is predischargeable during said third phase through said fourth element and said first capacitor is predischargable during said third phase through said third and fourth elements.

17. The arrangement as recited in claim 16 wherein binary data is applied to said third element to control its state during a fourth phase subsequent said third phase and prior to said first phase.

* * * * *